United States Patent
Wen et al.

(10) Patent No.: US 8,217,834 B2
(45) Date of Patent: Jul. 10, 2012

(54) SYSTEM AND METHOD FOR BEAMFORMING IN A WIRELESS COMMUNICATION SYSTEM

(75) Inventors: Chun Hsien Wen, Jhubei (TW); Jiunn Tsair Chen, Jhubei (TW); Cheng Hsuan Wu, Jhubei (TW); Yen Chin Liao, Jhubei (TW)

(73) Assignee: Ralink Technology Corporation, Jhubei, Hsinchu County (TW)

( * ) Notice: Subject to any disclaimer, the term of this patent is extended or adjusted under 35 U.S.C. 154(b) by 512 days.

(21) Appl. No.: 12/499,635

(22) Filed: Jul. 8, 2009

(65) Prior Publication Data
US 2010/0182198 A1    Jul. 22, 2010

(30) Foreign Application Priority Data
Jan. 16, 2009  (TW) .............................. 98101473 A

(51) Int. Cl.
*H01Q 3/00* (2006.01)
(52) U.S. Cl. ............................ 342/373; 455/69; 375/219
(58) Field of Classification Search ................... 455/39, 455/73, 522, 69, 101, 562.1; 375/267, 219; 370/342, 332, 338; 342/361, 363, 375, 368, 342/373
See application file for complete search history.

(56) References Cited

U.S. PATENT DOCUMENTS

| | | | |
|---|---|---|---|
| 2006/0291544 A1* | 12/2006 | Fischer et al. | 375/219 |
| 2007/0104288 A1* | 5/2007 | Kim | 375/267 |
| 2007/0160011 A1* | 7/2007 | Kim et al. | 370/332 |
| 2007/0249296 A1* | 10/2007 | Howard et al. | 455/101 |
| 2008/0101493 A1* | 5/2008 | Niu et al. | 375/267 |
| 2009/0161646 A1* | 6/2009 | Li et al. | 370/342 |

* cited by examiner

*Primary Examiner* — Lana N Le
*Assistant Examiner* — Golam Sorowar
(74) *Attorney, Agent, or Firm* — Hamre, Schumann, Mueller & Larson, P.C.

(57) ABSTRACT

The method for beamforming in a wireless communication system comprises the steps of: receiving a sounding packet so as to estimate channel state information between a transmitter and a receiver; generating a beamforming matrix in accordance with the channel state information; generating a beamforming steering matrix by multiplying the beamforming matrix by a rotation matrix; and feeding back the beamforming steering matrix.

4 Claims, 3 Drawing Sheets

SYSTEM AND METHOD FOR BEAMFORMING IN A WIRELESS COMMUNICATION SYSTEM

BACKGROUND OF THE INVENTION

1. Field of the Invention

The present invention relates to a wireless communication system, and more particularly, to a system and method for beamforming in a wireless communication system.

2. Description of the Related Art

With the increasing popularity of mobile communications, consumer demand for communication services is growing rapidly, and therefore there is an urgent need to effectively improve the bandwidth utilization and communication quality. Wireless communication system configurations can be classified into single-input-single-output (SISO), single-input-multiple-output (SIMO), multiple-input-single-output (MISO) and multiple-input-multiple-output (MIMO), in accordance with the number of antennas of a receiver and a transmitter. In a SISO system, the transmitter includes only one antenna for transmitting RF signal, which is later received by only one antenna of the receiver. When the receiver includes two or more antennas, one of the two or more antennas will be selected to receive input signals. In a SIMO system, the transmitter includes at least two antennas. In a MIMO system, the transmitter and receiver each includes at least two antennas and thus form the corresponding wireless channels thereof. The transmitter uses, for example, spatial and time coding functions to process data in parallel, and transmits multiple data streams by the at least two antennas. The receiver receives the multiple data streams through multiple wireless channels and then uses spatial and time decoding functions to capture the content of the multiple data streams. As such, the MIMO system provides higher throughput and communication efficiency than single-input or single-output systems.

However, the MIMO system can suffer from some frequency interference and fading problems when transmitting. The fading problems include variations of magnitude, phase or time delay of wireless signals when transmitting after a period of time or a distance. A small-scaled propagation model can be used to analyze and simulate signal fading effect under a multi-path environment. The receiver receives signals through different link conditions, e.g., multiple paths or Doppler effect. The different link conditions cause variations in signal-to-noise ratio (SNR), which defines the ratio of a signal power to a noise power. If the SNR is too low, it indicates that the wireless channels cannot support a higher data rate or otherwise increase the bit error rate. On the other hand, if the SNR is too high, hardware resources are wasted. Therefore, it is necessary to propose a new wireless communication system and method for beamforming so that signals going through different link conditions and wireless channels can obtain a best SNR performance.

SUMMARY OF THE INVENTION

The method for beamforming in a wireless communication system in accordance with one embodiment of the present invention comprises the steps of: receiving a sounding packet so as to estimate channel state information between a transmitter and a receiver; generating a beamforming matrix in accordance with the channel state information; generating a beamforming steering matrix by multiplying the beamforming matrix by a rotation matrix; and feeding back the beamforming steering matrix.

The beamforming receiver in accordance with one embodiment of the present invention comprises a channel state estimator, a matrix generator and a steering matrix generator. The channel state estimator is configured to estimate a channel coefficient matrix of a wireless channel. The matrix generator is configured to generate a rotation matrix. The steering matrix generator is configured to generate a steering matrix in accordance with the channel coefficient matrix and the rotation matrix, wherein the steering matrix is fed back to a transmitter.

The wireless communication system in accordance with one embodiment of the present invention comprises a transmitter configured to transmit a sounding packet and a receiver configured to receive the sounding packet. The receiver comprises a channel state estimator, a matrix generator and a steering matrix generator.

BRIEF DESCRIPTION OF THE DRAWINGS

The invention will be described according to the appended drawings in which.

PREFERRED EMBODIMENT OF THE PRESENT INVENTION

Figure 1:
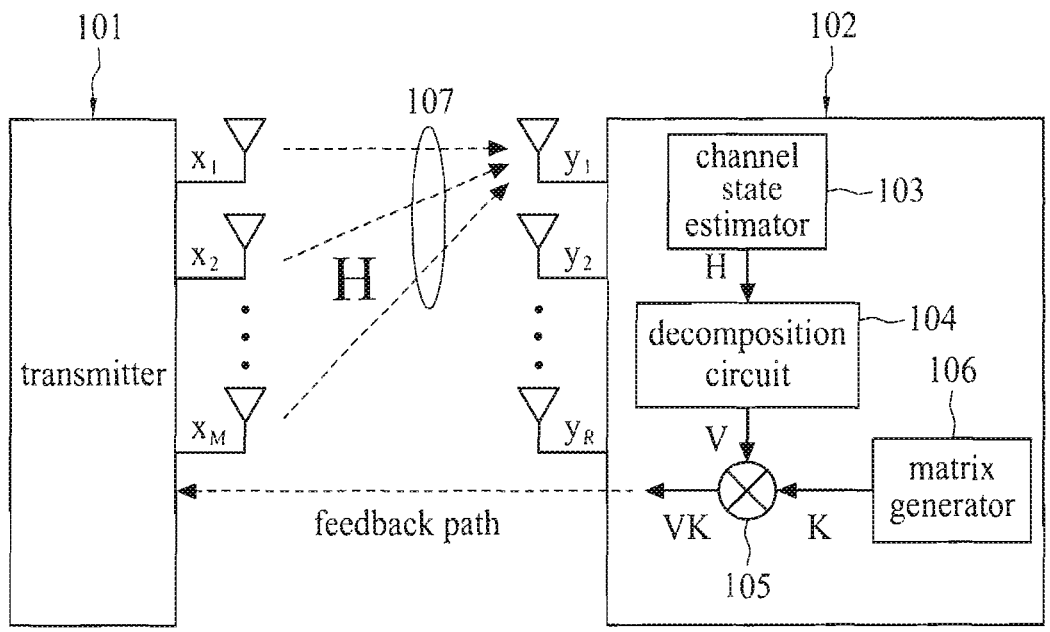
FIG. 1 illustrates a block diagram of a MIMO transceiver in accordance with one embodiment of the present invention.

FIG. 1 illustrates a block diagram of a MIMO transceiver in accordance with one embodiment of the present invention. In a MIMO system, to compensate power degradation and signal distortion caused by a multi-path effect when transmitting, the transceiver utilizes a beamforming technique to enhance signal strength and depress noise and interference. Referring to FIG. 1, the MIMO system 10 has M transmitting antennas and R receiving antennas, where the relationship between received signals $y_1, y_2, \ldots, y_R$ of the receiver 102 and transmitted signals $x_1, x_2, \ldots, x_M$ of the transmitter 101 is expressed as follows:

$$Y = H \cdot X + N \quad (1)$$

Each element in equation (1) can be a vector or a matrix, where N denotes a white Gaussian noise, Y denotes received signals $y_1, y_2, \ldots, y_R$, which is formed by an R×1 vector, X denotes transmitted signals $x_1, x_2, \ldots, x_M$, which is formed by an M×1 vector, while noise N is formed by an R×1 vector. H represents a channel coefficient matrix, which is formed by an R×M matrix, representing a frequency response between a transmitter and a receiver. In this embodiment, the receiver 102 includes a channel state estimator 103, which determines channel state information by measuring wireless channels 107 and generates a channel coefficient matrix H. In this embodiment, to perform the process, a decomposition circuit 104 performs a singular value decomposition (SVD) upon the channel coefficient matrix H to generate a beamforming matrix V. The decomposition circuit 104 can use the following equation to decompose the channel coefficient matrix H:

$$H = U\Sigma V^* \quad (2)$$

Where both of U and V are unitary matrices, $\Sigma$ denotes a matrix with nonnegative numbers on the diagonal and zeros off the diagonal, and $V^*$ denotes a conjugate transpose of V.

The receiver transmits the channel state information to the transmitter through a feedback path of the MIMO system.

The channel state information can adopt beamforming technique to compensate the current channel condition by increasing SNR level in the receiver. Referring to FIG. 1, a beamforming matrix V generates a beamforming steering matrix VK after going through a matrix multiplier 105, and provides the transmitter 101 with the beamforming steering matrix VK as feedback information so as to improve the received signals under different channel conditions. The matrix multiplier 105 and decomposition circuit 104 are examples of steering matrices. After the beamforming steering matrix VK is generated, the relationship between received signals $y_1, y_2, \ldots, y_R$ of the receiver 102 and transmitted signals $x_1, x_2, \ldots, x_M$ of the transmitter 101 are expressed as follows:

$$Y=HVKX+N \quad (3)$$

After combining equations (2) and (3), equation (4) is expressed as the following:

$$Y=U\Sigma V^*(VKX)+N=U\Sigma KX+N \quad (4)$$

An equalizer in the receiver 102 performs a matrix inversion, and equation (5) is obtained as follows:

$$K^{-1}\Sigma^{-1}U^{-1}Y=X+K^{-1}\Sigma^{-1}U^{-1}N \quad (5)$$

Figure 2A:
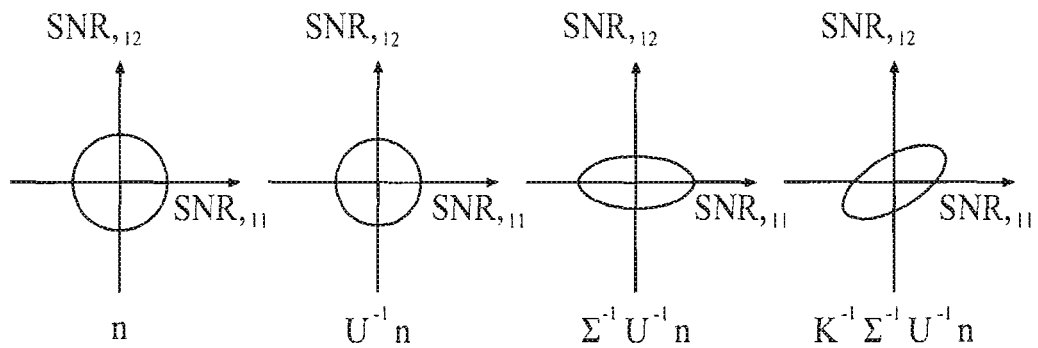
FIGS. 2A and 2B illustrate SNRs on different channels.
Figure 2B:
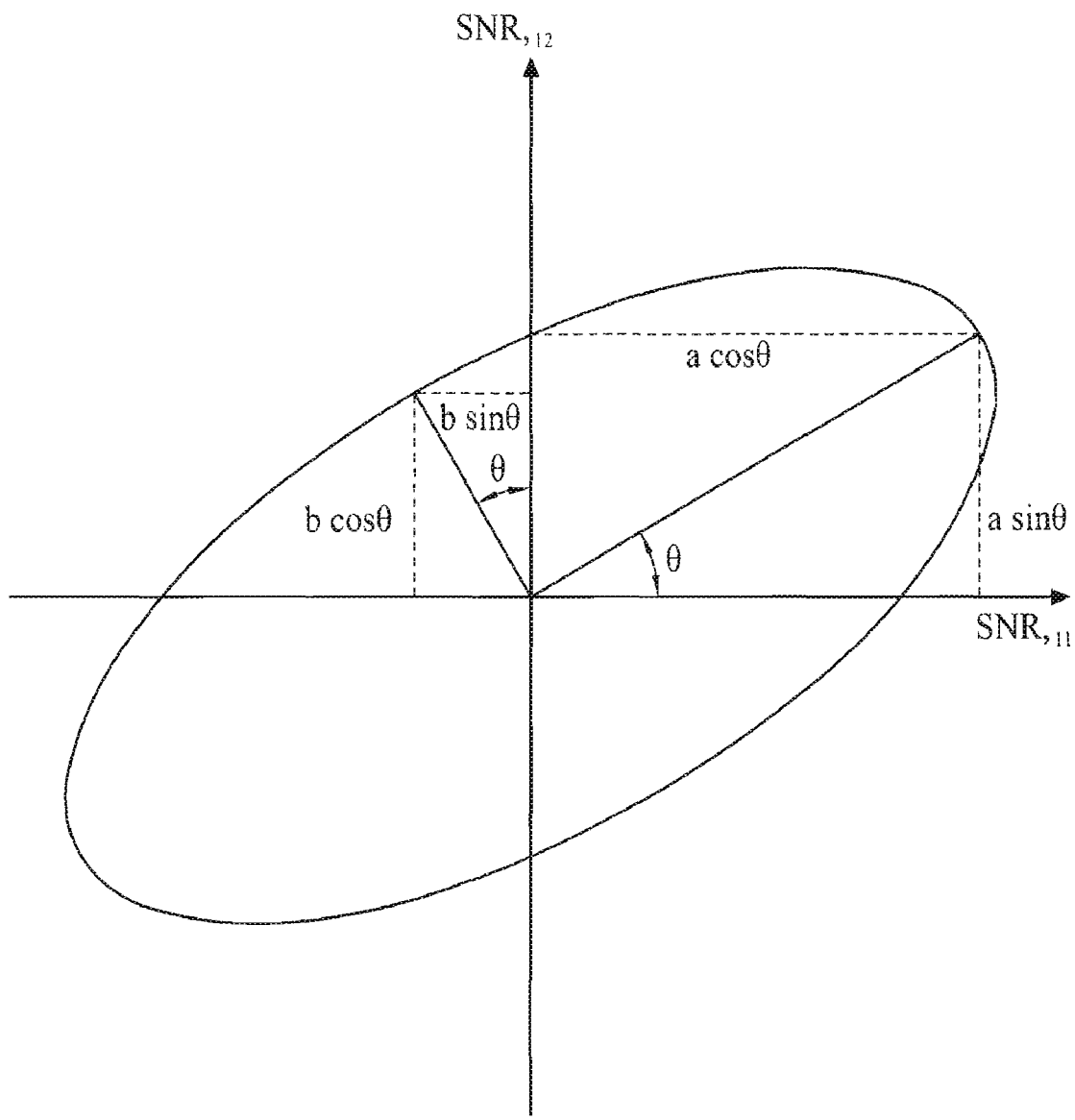

Referring to FIG. 2A and 2B, the abscissa in FIG. 2A denotes a noise value a on a first channel between a first receiving antenna and a first transmitting antenna, while the ordinate in FIG. 2B denotes a noise value b on a second channel between the first receiving antenna and a second transmitting antenna. After the beamforming steering vector VK is fed back to the transmitter 101, the noise value of the first channel changes to a $\cos \theta + b \sin \theta$, while the noise value of the second channel changes to a $\sin \theta + b \cos \theta$. That is, noises on different channels can be adjusted by receiving the feedback of the beamforming steering matrix, and therefore the SNR of received signals on different channels can be optimized by compensation. In this embodiment, the matrix K is generated by a look-up table in accordance with an optimized SNR and a previous SNR. In other embodiments, the rotation matrix K is generated in accordance with channel conditions (e.g., $\Sigma$ matrix), modulation and coding scheme (MCS) or information of the equalizer.

Figure 3:
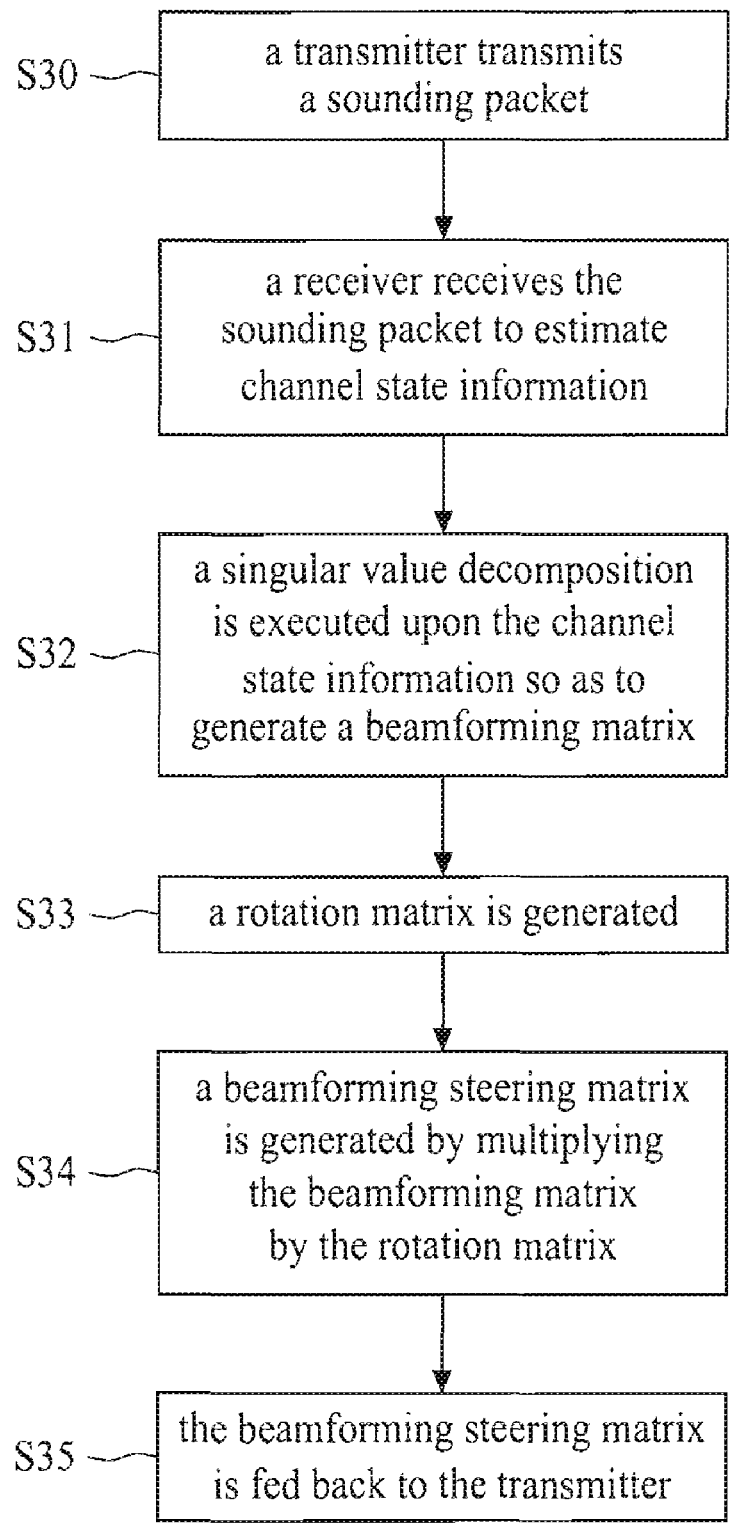
FIG. 3 shows a flow chart of a beamforming method in a wireless communication system in accordance with one embodiment of the present invention.

FIG. 3 shows a flow chart of a beamforming method in a wireless communication system in accordance with one embodiment of the present invention. In step S30, the transmitter 101 transmits a sounding packet. In step S31, the receiver 102 receives the sounding packet to estimate channel state information. In step S32, a singular value decomposition is executed upon the channel state information in accordance with equation (2) so as to generate a beamforming matrix V. In step S33, a rotation matrix K is generated by a look-up table in accordance with an optimized SNR and previous SNR. In other embodiments, the rotation matrix K is generated in accordance with channel conditions (e.g., $\Sigma$ matrix), modulation and coding scheme (MCS) or information of the equalizer. In step S34, a beamforming steering matrix VK is generated by multiplying the beamforming matrix V by a rotation matrix K. In step S35, the beamforming steering matrix VK is fed back to the transmitter 101 so that the SNR of received signals on different channels can be optimized by compensation.

The above-described embodiments of the present invention are intended to be illustrative only. Numerous alternative embodiments may be devised by persons skilled in the art without departing from the scope of the following claims.

What is claimed is:

1. A method for beamforming in a wireless communication system, comprising the steps of:
   receiving a sounding packet so as to estimate channel state information;
   generating a beamforming matrix in accordance with the channel state information;
   generating a beamforming steering matrix by multiplying the beamforming matrix by a rotation matrix; and
   feeding back the beamforming steering matrix.

2. The method of claim 1, wherein the beamforming matrix is generated in accordance with a singular value decomposition.

3. The method of claim 1, wherein the rotation matrix is generated in accordance with an optimized signal-to-noise ratio (SNR) and a previous SNR.

4. The method of claim 1, wherein the rotation matrix is a diagonal matrix generated in accordance with a singular value decomposition.

* * * * *